INVENTOR.
Carl D Russell

United States Patent Office 3,330,126
Patented July 11, 1967

3,330,126
MECHANICAL INJECTION AND ABSORPTION
HEAT-OPERATED REFRIGERATION APPA-
RATUS AND METHOD
Carl D. Russell, 1209 Walnut St.,
Muskogee, Okla. 74401
Filed Oct. 7, 1964, Ser. No. 402,356
20 Claims. (Cl. 62—101)

This invention relates to improvements in mechanical-injection absorption refrigeration apparatus employing a combination of fluids, using one fluid to function as powering and heat transfer medium as well as acting as a refrigerant fluid, the other functions as an absorbent and heat transfer medium.

Broadly stated it is the principal object of the invention to provide a compact, efficient, practical, and thoroughly dependable heat-operated mechanical injection absorption refrigeration apparatus of the type employing a low boiling point refrigerant fluid (i.e. ammonia) which when heated provides a high pressure vapor serving as the powering or motive fluid actuating the motor-injectors and then condensed as a liquid ammonia then becoming the refrigerant fluid. A companion fluid (i.e. water) functions as an absorbent and heat transfer medium.

Another object of the invention is to provide an improved absorption refrigeration method and apparatus by the use of mechanical devices which direct and propel the operating fluids, the mechanical devices also enhance and induce the functions of the operating fluids, thus inducing faster heat transfer.

Still another object of the invention is a continuous three cycle motor injector apparatus, so constructed to allow liquids to become the vehicle whereby forms of energy and forces may change, to either thermal, mechanical or physical as the applications required throughout the three cycles of operation.

Still another object of the invention is a method whereby that the entire functioning of the apparatus is obtained by heat supplied to the boiler and evaporator, which also allows the art of hermetic sealing of the working mechanism.

And still another object of the invention is the provisions made for supplying mixed liquified working fluids to the boiler in accordance with the demands of the apparatus.

Still another object of the invention is a means to aid in inducing the heat back into the boiler, and to aid in reducing temperatures of the fluids by the mechanical applications of the apparatus.

Still another object of the invention is a series of means to induce faster mixing of fluids and vapors to advance absorbent action.

A still further object of the invention is to provide a safe means to control the supply of fuel necessary to the functioning, and also being able to discontinue the supply of fuel should either the pilot light fail to stay lighted or the operating pressure become excessive for any reason.

A still further object of the invention is a means to withdraw the unvaporized liquids from the evaporator.

A still further object of the invention is a means to apply thermal effects to aid in causing an imbalance of the mixed liquids, allowing the richer ammonia liquids to rise to the top of the accumulators making it accessible, reducing the amount of liquids to be heated.

A still further object of the invention is to provide a series of means to promote cooling effects.

Still yet another object of the invention is to provide an improved absorbent refrigeration apparatus by the use of heat and liquids (ammonia and water) and novel integrated control devices, power mechanism, physical energy or forces, and thermal dynamics. In the first instance for a supply of a metered volume of fuel to the boiler, thereby deriving a working force in coordination with mechanical devices to direct and cause functioning of the various operations necessary in one of the cycles, thereby also supplying the mechanical forces to cause the functioning of the processes necessary to prepare liquids and vapors of ammonia and water most suitable for the absorbent cycle process, and by the aforementioned acts and cycles, allows the refrigeration ability of the fluid to effect the thermal dynamics necessary to imbalancement of fluids allowing suitable working fluid mixture to be supplied to the boiler to promote the overall operation, and all cycles are obtained simultaneously in continuation.

Reference characters will hereafter be designated in like numerals throughout the description in this specification.

The above and other objects and features of the advantages of the invention will be seen from the following detailed description taken with the accompanying drawings.

Wherein:

FIG. 1 is a diagrammatic view illustrating the improved refrigeration apparatus according to the invention, together with the controls thereof.

Also shown in FIG. 1 is a portion of the fuel-control valve mechanism 7 which is an anti-percolating valve, control rod 17, thermostat 18, and fuel supply valve 19, are fully described in numerals 5, 6, 7, 8 and 9 of my Patent 2,637,981 granted May 12, 1953.

FIG. 2 also shows a reversing valve mechanism designated 24 which is fully described in my patent granted Jan. 11, 1953, Patent Number 2,699,153 entitled Reversing Valve Mechanism and in my improved reversing valve described fully in my Patent Number 3,236,441 granted Feb. 22, 1966 entitled Reversing Valve Mechanism.

Also shown in this drawing of FIG. 2 are the motor-injector 6 and the means to reciprocate the pistons each powered and exhausted in the same direction, and the valving means to forward the fluids by the injectors, and the pressure coil and relief valve, and a rectifier for cooling vapors.

Figure 6:
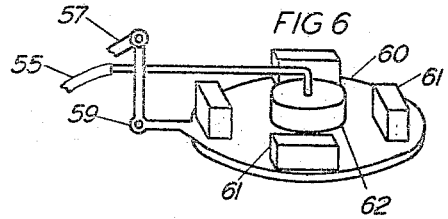

FIG. 6 is a perspective view of the float assembly which is prepared to connect to the control rod of the float valve assembly, also shown are means for pivoting, permitting up and down motion of the float and, within the center portion of the float, a small skimmer float having a passageway formed through the axial area; a means to withdraw top lighter richer fluid with an extending tube to receive a flexible tube allowing the joining to the tube that is extended from the float valve assembly.

Figure 7:
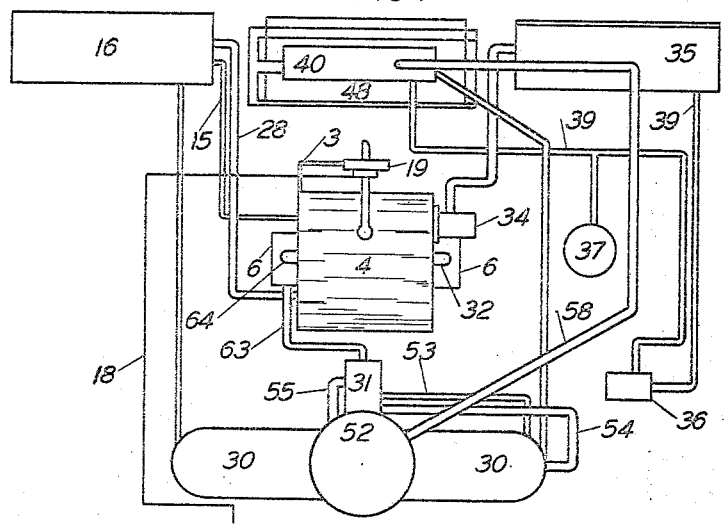

FIG. 7 is a complete top view of the apparatus in its entirety.

Figure 1:
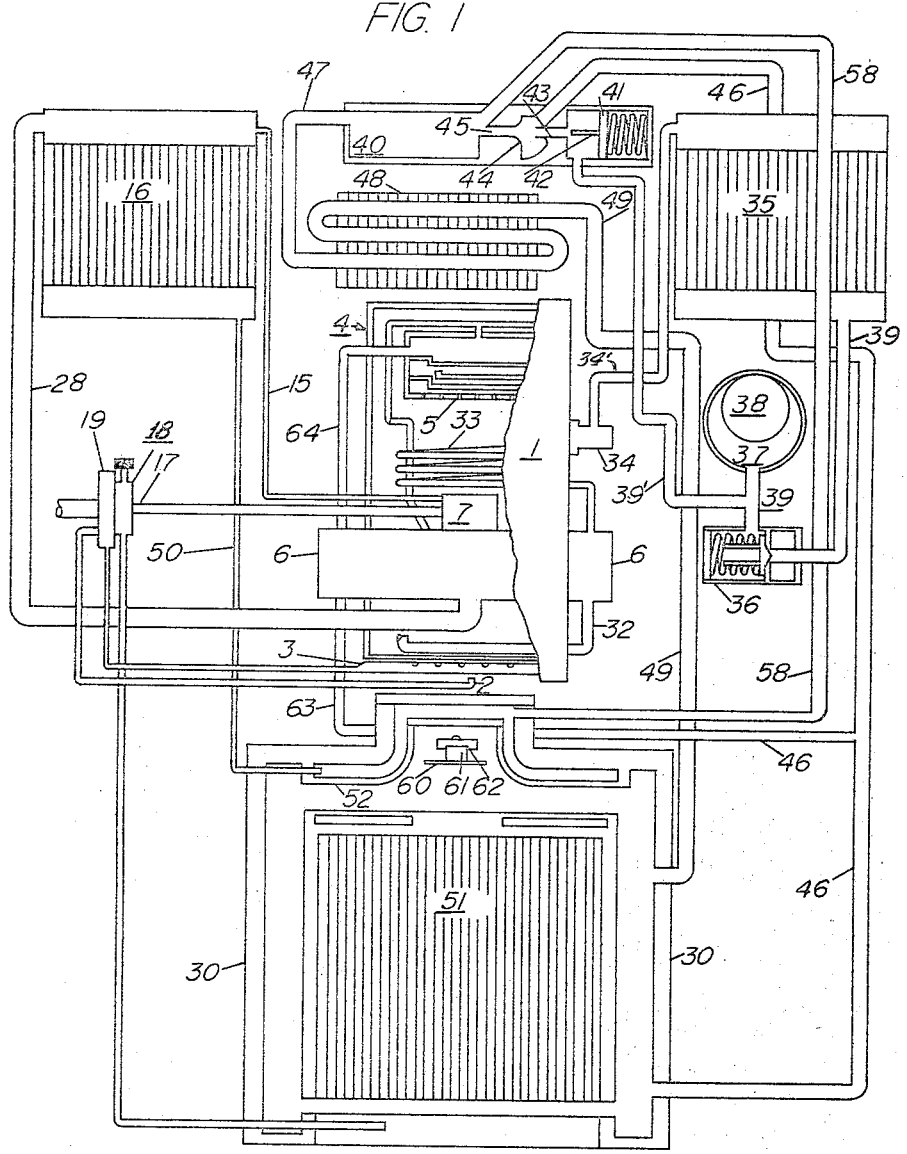
Figure 2:
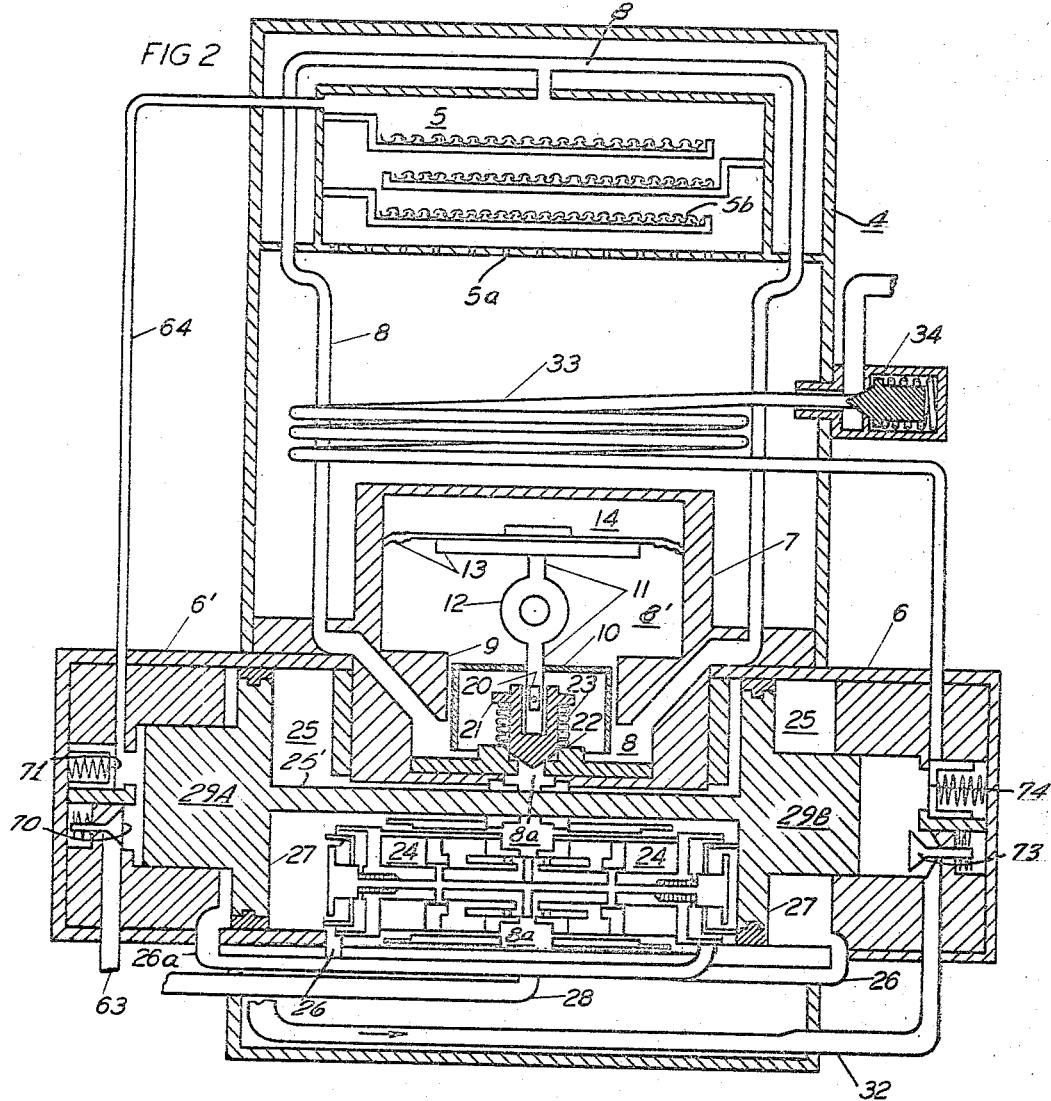

In FIGS. 1 and 2 the apparatus comprises the following components: Shield 1 covering the heated portion (but broken away to reveal other elements), pilot light 2, main burner 3, boiler 4 (best seen in FIG. 2), rectifier 5, motor-injector 6, control valve 7, control-valve passage 8 (FIG. 2), piston cylinder 9 (FIG. 2), control-valve piston 10 (FIG. 2), control valve shaft 11 (FIG. 2), enlarged portion 12 (FIG. 2) of the shaft, 11, diaphragm assembly 13 (FIG. 2), control valve cavity 14 (FIG. 2), a line 15 (FIG. 1) extending from diaphragm cavity of the control valve to the top of the ammonia condenser 16, control rod 17 (FIG. 1) extending to the fuel supply valve assembly, thermostat 18, fuel supply valve 19, control valve linkage 20 (FIG. 2), control valve 21, control seal 22, control valve spring 23, motor valve mechanism 24, motor injectors cylinders 25 (FIG. 2), passages 26 allowing pressures on both pistons to be applied in the same direction at the same time, pistons (29A and 29B) of the motor portion of the motor injectors 27, exhaust passage 28, extending from the motor to the ammonia condenser 16, injector piston 29A that supplies mixed fluids to the boiler; a storage for mixed liquids, (accumulator 30), float valve 60, liquid line 32 to injector; injector piston 29B that withdraws and forwards unvaporized liquids from the boiler to the heat exchange coil 33 for dispersing heat into boiler, 4; predetermined pressure valve 34; cooling coil (cooler) 35 for water; predetermined pressure valve, 36 (FIG. 1); chamber, 37; pulsation dampener, 38; passage, 39; jet type mixing chamber or absorber, 40; closing and cleaning valve, 41; needle for cleaning and sealing jet passage, 42; jet passage, 43; space between jet passage and venturi, 44; venturi, 45; passage 46 from the accumulator; passage 47 extending from the mixing chamber or absorber 40 to the mixed fluid cooling coil 48, 47; passageway 49 from the cooling coil 48 to the accumulator 30, 49; tube 50 for passing liquid ammonia to the evaporator 51, 50; portion 52 of the accumulator prepared within confine of the evaporator to imbalance liquids; line 53 (FIG. 7) of capillar tube type to allow withdrawal of liquids from the bottom of the evaporator and pass them into the float valve assembly; line from the evaporator to the float valve assembly; line 55 (FIG. 5) from skimmer float to the float valve assembly; a cylinder type three position valve 31 being a portion of the means to control the supply of proper mixed fluids to be forwarded to the boiler control rol 56 therefor; portion 57 of the linkage of the float assembly; vapor passage from the evaporator to the mixing chamber; pivot 59 (FIG. 6) of the float assembly; plate 60 holding the floats; floats 61; skimmer float 62 (FIG. 6); passage 63 (FIG. 7) extending to the injector; passage 64 (FIG. 7) from the injector to the rectifier.

This invention relates to an absorption and injection refrigeration apparatus which is comprised of a combustible heat source being supplied by valve mechanism in communication with a thermostat 18, with line from the fuel supply valve mechanism to a main burner 3, and pilot light, 2. The arrangement as positioned with shielding 1, aids in inducing the heat of each part in communication with the boiler 4. Now as the pilot 2, is lighted, the fluids and vapors in boiler 4, are warmed, vapor pressure rises and warms the rectifier 5, and motor-injector, 6, as all portions inside the boiler become warmer, pressures increase causing pressure to rise in control head 7, which is in communication by passages 8 (FIG.. 2) extending from the rectifier 5 to control valve 7. The control head 7 has a cavity 8 for the collection of vapors and in its confines and has a portion forming a cylinder 9 fitted with a piston 10 which is secured to a shaft 11 extending upward. A portion of this shaft 11 is enlarged and rounded at 12, shaft 11 extending upward is secured to diaphragm 13.

The diaphragm 13 fitted in cavity 14 forms a closure on the outer face of the diaphragm 13. A line 15 extends from this cavity to the ammonia condenser 16 allowing the cavity 14 and the condenser 16 to be in communication with each other, thus holding vapor pressures the same; however, the surface area of the diaphragm 13 is somewhat larger than the exposed underneath area of the piston 10 and therefore the pressure applied to the piston 10 will have to be greater to bring force enough to raise against condenser 16 pressure. The enlarged portion of the shaft 12 extending between the piston 10 and the diaphragm 13 is in communication with a shaft 17 extending at right angles, the end of which contacts the ball-shaped enlarged portion 12 causing a motion inward or outward as the surface changes with its up or down motion. The shaft 17 which is in communication with a thermostat 18 effects the operation of the fuel valve 19 therefore movement of the piston affects the fuel supply when the thermostat 18 calls for cooling.

Now as fluid pressure in the boiler 4 rises to a predetermined pressure, applying forces necessary to cause piston 10 to overcome the condenser 16 pressures exerted on the diaphragm 13 to permit the piston 10 to move to a more upward position which moves the companion rod 17 outward by the changing of the rounded ball or enlarged surface 12. Now with the thermostat 18 calling for cooling, the main burner 3 is supplied with fuel and is lighted by the pilot light 2.

In general, the operation may be noted as follows and will be described in detail hereinafter. The refrigerant is boiled off from the water and goes through the rectifier for separating water vapors from ammonia vapors and also for reducing the light ammonia vapor into heavy ammonia vapor for passing through the valve and pumping system, as high-pressure vapors for driving the pistons, and then passing into the cooling coil or condenser to be reduced to a liquid. The liquid is carried by a capillary tube into the evaporator to be expanded, causing cooling effects in the evaporator. The liquid is then allowed to pass, as a lower pressure vapor, into the absorber where it is absorbed by the water or absorbent fluid.

With the foregoing general description in mind, the main burner 3 supplies heating as called for to vaporize the ammonia or refrigerant fluid.

Figure 3:
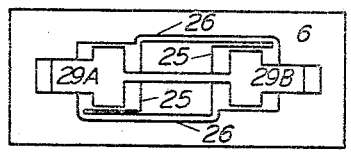
FIG. 3 is a schematic illustration of the motor-injector showing means for inletting to and exhausting the outer end spaces of the cylinders thereof to afford the power of two pistons rather than one piston.
Figure 4:
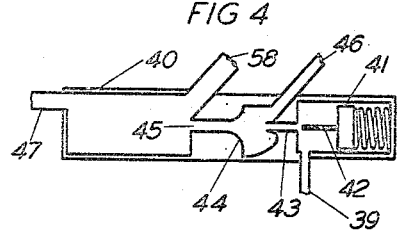
FIG. 4 is a sectional schematic view showing the mixing chamber portions and passages which comprise the jet and venturi passages and as means for closing and cleaning the orifices.

As vapor pressures rise, the piston 10 moves farther upward until the linkage 20 of the valve 21 opens the passage 8 to the motor-injectors. At this instant the force of pressure is relieved on the valve 21 and spring 23 moves the valve 21 farther upward allowing the full supply of vapor pressures to enter into the valve mechanism 24 (patent identified supra) whereby it is directed into cylinders 25 alternately, because of passages 26 (FIGS. 2 and 3) which are provided to allow pressure vapors to move or power connected pistons 27 in reciprocating motion in the same direction and either to exhaust, in a like manner, through passage 28, in communication with the ammonia condenser 16.

As the large pistons 27 are portions of the smaller injector pistons 29A and 29B, and have the same reciprocatory travel, one injection piston 29A, draws mixed liquids from the float valve 31; and forwards it to the rectifier 5 which acts as a coolant aiding the separation of ammonia and water vapors as they flow through the rectifier 5 and into the boiler. As the refrigeration liquids are vaporized, the heavier, weaker liquids are deposited in the bottom of the boiler 4. These weaker residue fluids, being a high percentage of water, are withdrawn through line 32 by the opposite injector 29B, and forwarded into coil 33, where they are held under a predetermined pressure by valve 34, where the pressure is increased to disburse heat from the liquids and then passed to a cooling coil 35, where they are again held under a predetermined lesser pressure by valve 36, and then passed into passage 39, that will be in communication with chamber 37. Chamber 37 is fitted with a compressible object 38, within its interior to allow the relief of pulsation. It is extended through a passage 39, to a jet-type mixing chamber 40, which is fitted with a predetermined pressure valve 41, that has a needle like extension 42 which aids the cleaning of the jet passage 43, as well as provides closure when the pressure ceases. From the opening between the jet passage and the venturi 45, a pressure drop is caused by the momentum of the liquids passing through the space 44. This pressure draws liquids through passage 46, leading from the lower portion of the accumulator 30. As these weaker liquids pass through the venturi 45, into the mixing chamber 40, they produce a pressure drop around the venturi 45, thus drawing ammonia vapors through passage 58 from the evaporator to the mixing chamber 40, to be mixed with the weaker fluids. Passageway 47, extending from the opposite end, allows mixed fluids to pass through the cooling coil 48 to be cooled and from there to be conducted through a passageway 49 to accumulator 30. Withdrawal of heat to produce cooling causes an imbalance of the liquids in the accumulator.

The accumulator 30 and evaporator 51 are conveniently constructed together, permitting highly efficient heat transfer. Thus, the evaporator 51 lowers the temperature of the mixture within the accumulator 30 near the upper portion thereof. It is this cooling which causes the imbalance of the fluids in the accumulator 30 and of course the richer ammonia fluids rise to the top.

Figure 5:
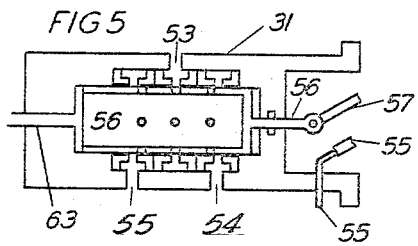
FIG. 5 is a sectional schematic view of the float valve assembly disclosing the passages, sealing arrangement, valve and connecting arm; also shown is the tube extending from the inside to the outside of the housing allowing a connection to be made between the float valve assembly and the skimmer float.

As the ammonia condenser 16 is cooled allowing the ammonia to condense then the liquid ammonia flows from the lower portion of the condenser 16 and is conducted through tube 50 into flashing chamber 52 which has been provided to cause an imbalance of liquids in the accumulator 30 and to cool the evaporator 51. This imbalance allows the richer ammonias to rise to this portion for their removal by the skimmer float 62 to the float valve 31 (FIG. 5). The unvaporized portion of fluids is allowed to pass into the evaporator 51 being first heavy ammonia vapors developed by the rectifier 5 and then cooled by the condenser 16, after having powered the motor-injector 6 via line 8 (FIG. 2) for further flash evaporating. From the lower region of the evaporator 51 a line 53 of capillary type extends to the float valve assembly 31 thereby withdrawing all unvaporized liquids. Now the water portion of the fluid of the entire system will move in such a manner that the water quantity in the accumulator 30 will remain somewhat constant. However, as the ammonia due to vaporization and condensing will fluctuate from time to time, causing the liquid level in the accumulator 30 to rise and fall, provisions have been made to allow selection by the floats and float valve mechanism of either top richer ammonia fluids or weaker bottom fluids to be withdrawn to maintain a more suitable mixture for functions of the apparatus.

Now as the heat losses are greater than the combustible heat supplied, with proper shielding of the entire mechanism along with air moving applications being suitably attached, its performance can doubtfully be excelled in removing heat from a given space.

The operation of the system will now be summarized as follows: The mechanical injection heat-operated absorbent refrigeration apparatus is filled with working fluids in the form of a refrigerant and absorbent liquid. Pilot light 2 (FIG. 1) is lighted causing boiler 4 and its contents to be heated to a condition whereby pressure is increased to a point necessary for thermostatic control to be operative.

As the boiler 4 and its contents are heated by the main burner 3 lit by pilot light 2, the refrigerant vapors rise from the absorbent liquids in boiler 4 and throughout the entire inner spaces allowed by passage 8, to be effective at control valve-head 7. Fuel valve 19 is responsive to control valve 7 under the direction of thermostat 17. Within control head 7, a diaphragm 13 (FIG. 2) forms a wall or a closure 14 in the upper portion thereof. On the upper side of this portion or cavity, a passageway 7' (see FIG. 1) extends to condenser 16 (uppermost area) whereby pressure vapors effect downward force against diaphragm 13.

As pressure rises in the boiler 4, caused by heating, this pressure also rises in passages 8 and cavities 8', and when pressure become great enough to cause upper movement of diaphragm 13, the overcome pressure of condenser 16 in cavity 14 and ball 12 of linkage 11 rises. A rod (not shown) within shaft 17 intersects the housings 7 and extends against the periphery of ball 12 being moved inward or outward because of the circular surface at this point of contact. The rod in shaft 17 and thermostat 18 co-act, with the positions of the rod being effective in opening the fuel supply of valve 19, allowing fuel to main burner 3 which is within the heat shield 1 at the bottom portion of boiler 4 to supply heat for the operation of the unit as long as the combined mechanism of the thermostat 18 and control head 7 call for heating.

Control of the heating of the boiler 4 is explained in further detail in my aforementioned patent, No. 2,699,153. As pressure still rises higher in boiler 4 and passages 8 and cavities 8', causing more fuel to be supplied to the boiler, further raising diaphragm 13 higher, valve 21 (connected to shaft 11 and slip pin 20 breaks the pressure seal in passage 22 and allows spring 23 to lift the valve higher. This allows free passage of the pressure of boiler 4 to be applied through passage 8a extending into the reversing valve mechanism 24, the subject of my aforementioned Patent 3,236,441.

This reversing valve contains closures and passages suitable for controlling both the flow of pressure (from passages 8 and 8a) to either of cylinders 6 and 6' and for exhausting the opposite cylinder, and further having means to make the interchange of supply or exhaust automatically at the end of the stroke of the pistons 29A and 29B. Connecting rod 25' extends between pistons 29A and 29B and the outer ends are reduced to form injector pistons within the reduced regions of cylinders 6 and 6'. It will be noted from FIG. 2 that piston 29A is somewhat larger than piston 29B as the amount of fluid to be pumped by 29A will be greater than the amount of fluid to be pumped by 29B and as 29B will pump much higher pressure than 29A.

In FIG. 2 reversing valve 24 has completely supplied cylinder 6' with pressure vapors by connecting passage 26 powering piston 29A on the inner side to the left and also powering 29B on the outer side to the left. Thus, the force of both pistons 29A and 29B is applied to the injector (lefthand portion) of piston 29A, moving piston 29A to the left. At the same time, reversing valve 24 was so positioned to exhaust through passage 28 extending to condenser 16 where a pressure drop has been facilitated. This explains one movement of the piston as accomplished by the reversing valve mechanism pressuring and exhausting the cylinders. Succeeding cycles follow in like manner, each stroke in an opposite direction. As the foregoing explains the power mechanism necessary for motivation of the fluids into given areas, the foregoing is the motion arrangement necessary in the operation of the entire unit. Heating the boiler continuously causes refrigerant vapors to rise and pass through rectifier 5 which is made up suitably of trays perforated with holes in their bottoms allowing heat transfer of hot rising refrigeration vapors with incoming cool mixed liquids effectively reducing and cleaning hot refrigeration vapors to a cleaner heavier vapor. These vapors pass into passage 8 to become at this point a source of high pressure agent that is the source of power in moving and pressuring the fluids as designated throughout further operations of the apparatus.

The absorbent function will now be described. FIG. 2 shows piston 29B on the right with the outer end of piston 29B and the right end of cylinder 6 being reduced to form a piston-cylinder arrangement having an inlet valve 73 and an exhaust valve 74. The inlet opening end of the boiler line 32 extends upwardly in boiler 4 to above the level of cylinder 6–6' so the liquid level remains at least at this height. This allows the motor-injector unit to be kept at about the same temperature as the heated mixed liquids of he boiler to avoid undue condensation. Heavier absorbent fluids are spilled over into openings (not shown)

of line 32 and are carried downward where the line extends along the bottom of boiler 4, near the heat supply, receiving the benefit of the extra heat, thus further vaporizing any refrigerant that might enter this passageway. As piston 29B moves to the left this heated absorbent liquid is drawn in through inlet valve 73 to fill this displacement. The instant the piston stops to reverse its movement from left to right, inlet valve 73 closes, trapping the liquid in this displacement. As the piston 29B moves to the right reducing the displacement in cylinder 6 forcing exhaust valve 74 to open upwardly into exit 33, for forwarding liquid thereto. As this liquid is forced under extreme pressure into this coil-like arrangement, it is held under high pressure by predetermined (pre-set) pressure valve 34 where the pressure is great enough to cause the liquid to heat to excess of boiler temperature, allowing it to radiate this heat back into the boiler and when pressure reaches a point high enough to overcome predetermined pressure valve 34. It is then forwarded by a passage 34 extending to a cooling arrangement 35 (FIG. 1) to be cooled to atmospheric temperatures and then passed through line 39 to another predetermined (pre-set) pressure valve where it is held until pressures become great enough to overcome this predetermined valve 36, and opening of valve 36 permits flow into passage 39 which has a passage extension to enclosure 37 which contains a compressible sphere or object 38 to reduce the pulsations effectively caused by the action of piston 29B. The liquid is forwarded through conduit 39a to enclosure 41 having a pre-set pressure valving arrangement of which needle 42 forms a closure of the tubular jet passageway 43. When pressures overcome and cause the needle 42 to be withdrawn from this tubular jet passage 43, the absorbent fluid (liquid) is forwarded through in a high pressure stream in the venturi 44 which causes a pressure drop in the outer confines of venturi 44, effectively drawing extra liquids from the bottom of accumulator 30 via conduit 46 to be induced into this high pressure stream forming a spray as it passes through the throat of the venturi 45. It enters into absorber 40 as a fine spray.

This ends the work of the devices supplying absorbent fluid to the absorber. Thus hot absorbent liquid has been transferred from the boiler to the absorber as cool liquid.

Returning now to the high pressure refrigerant vapors after it had done its work motivating the motor-pistons of the apparatus and then passed into the cooling arrangement (condenser) 16, it will be appreciated that pressures are reduced as the high pressure vapors are cooled and reduced to heavy vapors and liquids. As arrangement 16 has disbursed the heat allowing it to become nearer atmospheric temperature, a capillary tube arrangement 50, extending to evaporator 51, is used where liquification takes place in tube 50. The evaporator 57 arrangement is a double-walled structure forming an accumulator 30 portion or section around portions of the evaporator's exterior to allow thermal effects upon the liquids the accumulator shall contain, heat flowing from the accumulator into the evaporator.

Capillary tube 50 enters and feeds the liquids to be evaporated at the upper portion of the evaporator 51 and drains downward through tubing arrangement of the evaporator 51 to be further vaporized which in turn creates what is called cooling to be used to reduce the temperature of the space around it by using the heat of the space to evaporate the refrigeration fluids passing into it. Also, unvaporized fluids drain to the bottom of the evaporator 51. From the uppermost portion of the evaporator, a passage 58 extends to absorber 40 and allows the vapors passage from the evaporator 51 to the absorber 40.

Now, the refrigerant liquids have been brought into the upper portion of evaporator 51 by capillary tube 50 where they are first expanded around the inner wall 52 of the accumulator 30, thus allowing metal contact aiding in cooling fluids of the accumulator 30, which is used in thermal diffusion of the mixed fluids in the accumulator. The refrigerant vapors flow from the evaporator through line 58 to absorbent chamber 40, where they are mixed and absorbed by the high pressure spray absorbent entering from the throat of the venturi 45. As these vapors and fluids are mixed, heating occurs and as they become mixed vapors in absorber 40 then flow through passage 47 cooling arrangement for condensing and liquifying. This is the reverse flow acting as a retardation until they have fully condensed and cooled to atmospheric temperatures. They then spill over through passage 49 extending to accumulator 30, as these vapors are liquified and cooled and then spill over into passage 49 and then are gravity-fed into the accumulator 30.

The accumulator is the means of storage of refrigerants and absorbent liquids as mixed liquids. The cooling arrangement allows the first introduction of the refrigerants into the evaporator to expand around the horizontal portion of the accumulator, causing this portion of the accumulator to be the cooler portion of the accumulator, which is least subject to liquid thermal action having a thermal effect of causing the refrigerant density to be more pronounced in the cooler portion of the accumulator.

Within this cooler portion, a combination consisting of a float valve 60 and a specially-designed higher level skimmer float valve 62 is arranged with a passage in its interior to withdraw, when connected to its passage and valving mechanism, the uppermost portions of the fluids contained in the accumulator.

In FIG. 2 the right-hand piston 29B, in its arrangement forwarding the absorbent fluids, has been described. Description will now be made of the acts for returning the mixed fluids from the accumulator back into the lower portion of the boiler. Float valve 61, by its movement on its pivot 59, gives longitudinal motion through shaft 57, whereby when the float is in downward position, it allows opening of passage 54 through interior 56 to allow opening into passage 63.

In normal position of the float valve, it causes opening of passage 53 through interior valve 56 and the extending through line 63. This allows unevaporated fluids to be drawn from the bottom of the evaporator. When the float is in its lowest position, fluids will be drawn through passage 54, which extends to passage 46, which further extends to the bottom of the accumulator 30. When the float is in its highest position, fluids of the accumulator contain more refrigerants than normal, thereby starving the evaporator and then passages leading from skimmer float 55, will open through float valve 56, allowing this richer refrigerant fluid to be drawn off through said passages 55 extending to line 63. Therefore the quantity of liquids in the accumulator will be very irregular due to refrigerant type liquids having a high quality in forming either a liquid or a vapor and thus constantly changing the quantity of fluid in accumulator 30.

The reasons why separate types of fluids must be supplied to the boiler are as follows:

(1) When the refrigerant liquids have liquified to a larger volume, due to coolness in a space not allowing heat sufficient to highly vaporize the liquids in the evaporator, then the float valve assembly will be in centering position to draw this unvaporized liquid back into the boiler and before this liquid has had time to heat, vaporize, cool and liquify it. The float valve will thus go lower, changing the valve mechanism, to cause fluids to be drawn from the bottom of the accumulator to aid in supplying additional absorbent liquids to further the operation.

(2) If the spaces around the evaporator are exceedingly warm, causing excessive amount of evaporation, then the pressure in the evaporator will be much higher, forcing a higher pressure into the absorber making an undue richer liquid to return from the absorber and adding more quantity to the absorbent fluid then held in the accumulator, causing the float to rise higher, which in turn, would cause float valving means to withdraw the uppermost fluids from the accumulator to be passed to the boiler until the excessive heat has been overcome.

(3) From the float valving means, passage 63 extends to the inlet valve 70 in cylinder 6' on the left side of FIG. 2. This piston 29A is moved to the right to cause more displacement in the cavity which allows filling of the cavity with selected mixed fluids, as directed by the float valving mechanism, to be forwarded on its opposite motion, and forced through exhaust valve 71 into line 64 extending through the boiler shell, into the rectifier 5 where these cool fluids become an agent for reducing the heated vapors into heavy pressure vapors before spilling over or passing through the perforated openings 5b of the bottom of the rectifier 5 to fall, by gravity, into the lower portions of the boiler 4 to become the mixed fluids necessary for the continuance of all operations described.

As many changes could be made in carrying out the above constructions without departing from the scope of the invention, it is intended that all matter contained in the above description or shown in the accompanying drawings shall be interpreted as illustrated and include equivalents thereof and not in a limiting sense.

I claim:

1. Refrigeration apparatus of a type employing refrigerant fluid and absorbent fluid, comprising in combination boiler means adapted to contain a mixture of said fluids and to be heated to vaporize the refrigerant fluid; motor-injector means comprising a reversing valve adapted for communication with opposed pistons of the motor-injector; conduit means extending from the boiler means to the reversing valve means to permit the refrigerant vapor to power the motor-injector; means comprising an accumulator portion and an evaporator portion; further conduit means extending from the motor-injector to the evaporator means for the refrigerant fluid leaving the motor-injector; a cooler; conduit means extending from the boiler means via one piston cylinder of the motor-injector to the cooler means whereby the absorbent fluid is powered through the cooler means, venturi means and absorber means in communication; conduit means from the cooler means to the venturi means; further conduit means from the evaporator means to the venturi absorber means; still further conduit means from the accumulator portion to the venturi means whereby the absorbent fluid in passing through the venturi means draws further absorbent fluid from the accumulator portion for mixture with the refrigerant fluid in the absorber means; and, control means for supplying rich refrigerating fluid from the accumulator portion back to the boiler by way of the other piston cylinder of the motor-injector in continuously regulating mixture proportions of said two fluids.

2. Refrigeration apparatus of a type employing refrigerant fluid and absorbent fluid, comprising in combination boiler means adapted to contain a mixture of said fluids and to be heated to vaporize the refrigerant fluid; motor-injector means comprising a reversing valve adapted for communication with opposed pistons of the motor-injector means; conduit means extending from the boiler means to the reversing valve means to permit the vaporized refrigerant to power the motor-injection means; a combined accumulator means and evaporator means; further conduit means extending from the motor-injector to the evaporator means for the refrigerant fluid; a cooler; conduit means extending from the boiler means via one piston cylinder of the motor-injector to the cooler means whereby the absorbent fluid is powered through the cooler means; venturi means and absorber means in communication; conduit means from the cooler means to the venturi means; further conduit means from the accumulator means and evaporator means to the venturi absorber means for fluid principally constituted of absorbent fluid; still further conduit means from the evaporator means to the absorber means for fluid principally constituted of vaporized refrigerant whereby the absorbent fluid in passing through the venturi means draws further absorbent fluid from the accumulator means for mixture with the refrigerant fluid in the absorber means; and, control means, including conduit means between the accumulator means, responsive to the liquid level of the mixture of fluids in the accumulator means for supplying fluid rich in refrigerating fluid from the accumulator means back to the boiler means by way of the other piston cylinder of the motor-injector when said level is greater than a predetermined level and for supplying fluid principally constituted of absorbent fluid by way of the one piston-cylinder back to the boiler means when said level is less than the predetermined level.

3. Refrigeration apparatus employing fluids comprising a refrigerant fluid and an absorbent fluid in mixed and substantially pure states, comprising, in combination, boiler means for heating a mixture of the fluids to vaporize, principally, the refrigerant fluid under high pressure and separate it from the mixture; combined accumulator means and evaporator means for producing cold by expansion of the expanded refrigerant fluid in the evaporator means in temperature responsive association with a mixture of said fluids in the accumulator means; mixing means for mixing lower pressure refrigerant liquid from the evaporator means with a mixture of said fluids from the accumulator means; and means operated by the refrigerant fluid under high pressure for pumping said mixture from the accumulator means back to the boiler means in proportionate mixture of refrigerant fluid to absorbent fluid as determined relative to a predetermined level of the mixture in the accumulator means, and for pumping the heated absorbent fluid from the boiler means to the mixing means.

4. Refrigeration apparatus employing a refrigerant fluid and an absorbent fluid comprising in combination, means for heating a mixture of the fluids to vaporize principally the refrigerant fluid under high pressure and separate it from the mixture; refrigerant condenser means for cooling the vaporized refrigerant fluid substantially to a liquid state; evaporator means adapted to contain refrigerant fluid for absorbing heat from the ambient atmosphere by expansion of the liquified refrigerant in temperature responsive association; said evaporator means also comprising an accumulator means; absorber means for mixing the expanded vaporized refrigerant from the evaporator means with a mixture of said fluids comprising a larger portion of absorbent fluid than refrigerant fluid also from the accumulator means; cooler means between the heating means and the absorber means for cooling the absorbent fluid; plural pumping means powered by the vaporized refrigerant under high pressure from the heating means for pumping said mixture from the accumulator means back to the heating means and for pumping principally heated absorbent fluid from the heating means to the absorber means via the cooler means; control means, responsive to the liquid level in the accumulator means, to select from the refrigerant fluids in the accumulator and the mixture in the accumulator a greater proportion of one of the fluids and mixture to be pumped back to the heating means to maintain the liquid level in the accumulator means relative to a predetermined level; fluid conveying coupling means for the heating means to the evaporator means for the refrigerant fluid; fluid conveying coupling means from the accumulator means to the heating means via the pumping means for returning the fluid to the heating means; fluid conveying coupling means from the heating means via the pumping means and cooler means to the absorber means; and fluid conveying means from the absorber means to the accumulator means.

5. Refrigeration apparatus employing a refrigerant fluid and an absorbent fluid comprising in combination, means for heating a mixture of the fluids to vaporize principally the refrigerant fluid under high pressure and reduce it to a heavy vapor; evaporator means for absorbing heat from the ambient atmosphere by expansion of the refrigerant fluid in temperature responsive association; said evaporator means comprising an accumulator means section; absorber means for mixing the expanded vaporized refrigerant from the evaporator means with a mixture of said fluids from the accumulator means section having a larger portion of absorbent fluid than refrigerant fluid; plural pumping means powered by the vaporized refrigerant under high pressure from the heating means for pumping said mixture from the accumulator means back to the heating means and for pumping principally heated absorbent fluid from the heating means to the absorber means; control means responsive to the liquid level in the accumulator means section to select a greater proportion of one of: the refrigerant fluid, and the mixture in the accumulator means section to be pumped back to the heating means to maintain the liquid level in the accumulator means section; fluid conveying means for coupling the heating means to the evaporator means via the pumping means for the refrigerant fluid; fluid conveying means for coupling the accumulator means section to the heating means via the pumping means for returning fluid to the heating means; fluid conveying means for coupling the heating means via the pumping means to the absorber means, and fluid conveying means for coupling the heating means via the pumping means to the absorber means, and fluid conveying means for coupling the absorber means to the accumulator means section.

6. Refrigeration apparatus employing a refrigerant fluid and an absorber fluid comprising, in combination, heating means for separating the fluids by vaporizing the refrigerant fluid and for reducing it into heavy refrigerant vapor; pumping means for powering the apparatus; evaporator means for expansion of the refrigerant fluid and for containing a mixture of said fluids in temperature transfer relation with the vaporized refrigerant; absorber means for remixing refrigerant fluid with absorbent fluid; accumulator means having a liquid level and being in physical contact with the evaporator means; means coupling the heating means to the accumulator means via the pumping means to permit the vaporized refrigerant to power the pumping means; accumulator means in physical contact with the evaporator means, means coupling the accumulator means to the heating means via the pumping means to return a mixture of said fluids to the heating means; means coupling the heating means via the pumping means to the absorber means to deliver substantially absorbent fluid thereto; means coupling the evaporator means to the absorber means to permit expanded refrigerant to pass thereto under its own pressure; means coupling the absorber means to the accumulator means to permit remixed fluids to re-enter the accumulator means; further means coupling the evaporator means to the heating means for delivering substantially refrigerant fluid thereto; and control means responsive to the liquid level in the accumulator means for regulating the return of fluids to the heating means.

7. The refrigeration apparatus of claim 6 wherein a refrigerant condenser is included in the coupling means between the pumping means and the evaporator means.

8. The refrigeration apparatus of claim 6 wherein an absorbent cooler is included in the coupling means between the pumping means and the absorber means for cooling the absorbent fluid.

9. The refrigeration apparatus of claim 8 wherein a heat exchanger is included in the coupling means between the pumping means and the cooler means for delivering heat from the absorbent fluid to the heating means.

10. The refrigeration apparatus of claim 9 wherein the coupling means between the absorbent cooler means and the absorber means includes a pressure regulating valve and an expandable chamber.

11. The refrigeration apparatus of claim 8 including a preset pressure valve and venturi means in the coupling means between the cooler means and the absorber means.

12. The refrigeration apparatus of claim 11 wherein the pressure valve includes a needle adapted to clean the venturi means when said valve is actuated.

13. The refrigeration apparatus of claim 11 further comprising coupling means between the accumulator means and the venturi means to permit absorbent fluid passing through the venturi means to draw a mixture of fluids from the accumulator means.

14. The refrigeration apparatus of claim 6 wherein the heating means comprises rectifier means to separate the fluid vapors and reduce light vapors to heavy vapors.

15. The refrigeration apparatus of claim 14 wherein the coupling means between the heating means and the pumping means for vaporized refrigerant fluid extends to the rectifier means to receive the vaporized refrigerant fluid from the heating means.

16. The refrigeration apparatus of claim 15 wherein the coupling means from the accumulator means back to the heating means via the pumping means extends to the rectifier means to cool the latter with fluid returned from the accumulator means.

17. The method of employing a refrigerant fluid and an absorbent fluid to produce refrigeration, comprising the steps of heating the fluids to separate for vaporization the refrigerant fluid from the absorbent fluid; deriving power from the separated refrigerant fluid; expanding the refrigerant fluid to produce cooling in temperature transfer relation with a mixture of the absorbent fluid and refrigerant fluid; remixing the expanded refrigerant fluid with the absorbent fluid to provide the mixture of fluids for said temperature transfer; cooling the heated absorbent fluid and directing it for said mixture with said refrigerant fluid; skimming from said mixture of fluids in temperature transfer relation fluid rich in refrigerant fluid content to reduce the amount of absorbent fluid heated; directing said fluid rich in refrigerant fluid content back for reheating; and utilizing the power derived from said refrigerant fluid for powering fluid movement of the absorbent fluid and mixture of fluids.

18. The method of claim 17 comprising the further step of developing a high-speed stream of absorbent fluid in association with the mixture of fluid which is in temperature transfer relation to pump by venturi principle said mixture under the power of the refrigerant fluid for remixing thereof.

19. The method of claim 17 including the futher step of using the skimmed fluid mixture returned back for heating to rectify the heated refrigerant fluid and reduce it into heavy refrigerant vapor.

20. The method of claim 17 wherein the skimming step is regulated in accordance with the liquid level of the mixture of fluids in temperature transfer relation with respect to the content of the refrigerant fluid in the mixture returned back for heating.

References Cited
UNITED STATES PATENTS

| | | | |
|---|---|---|---|
| 2,750,763 | 6/1956 | Kogel | 62—492 X |
| 2,929,222 | 3/1960 | Lang | 62—487 X |
| 2,930,204 | 3/1960 | Lang | 62—488 X |
| 3,046,756 | 7/1962 | Whitlow et al. | 62—483 X |

FOREIGN PATENTS

| | | |
|---|---|---|
| 593,548 | 3/1934 | Germany. |
| 840,249 | 5/1952 | Germany. |
| 708,482 | 5/1954 | Great Britain. |

LLOYD L. KING, *Primary Examiner.*